United States Patent [19]

Bair

[11] Patent Number: 4,698,414

[45] Date of Patent: Oct. 6, 1987

[54] COPOLY(P-PHENYLENE TEREPHTHALAMIDE/2,6-NAPH-THALAMIDE)ARAMID YARN

[75] Inventor: Thomas I. Bair, Wilmington, Del.

[73] Assignee: E. I. Du Pont de Nemours and Company, Wilmington, Del.

[21] Appl. No.: 909,100

[22] Filed: Sep. 16, 1986

[51] Int. Cl.[4] .............................................. C08G 69/32
[52] U.S. Cl. .................................. 528/339; 428/474.4; 428/474.7; 428/474.9; 528/348
[58] Field of Search .............................. 528/339, 348; 428/474.4, 474.7, 474.9

[56] References Cited

U.S. PATENT DOCUMENTS

| 3,671,542 | 6/1972 | Kwolek | 260/30.8 R |
|---|---|---|---|
| 3,767,756 | 10/1973 | Blades | 264/184 |
| 3,819,587 | 6/1974 | Kwolek | 260/78 R |
| 3,869,429 | 3/1975 | Blades | 260/78 S |

FOREIGN PATENT DOCUMENTS

| 4018796 | 5/1974 | Japan . |
| 57-3705 | 1/1982 | Japan . |
| 45401/75 | 4/1984 | Japan . |

Primary Examiner—Harold D. Anderson

[57] ABSTRACT

Yarns of copoly(p-phenylene terephthalamide/2,6-naphthalamide) are disclosed which exhibit toughness and tenacity greater than the toughness and tenacity of yarns of poly(p-phenylene terephthalamide) having the same dimensions and made by the same process.

7 Claims, 5 Drawing Figures

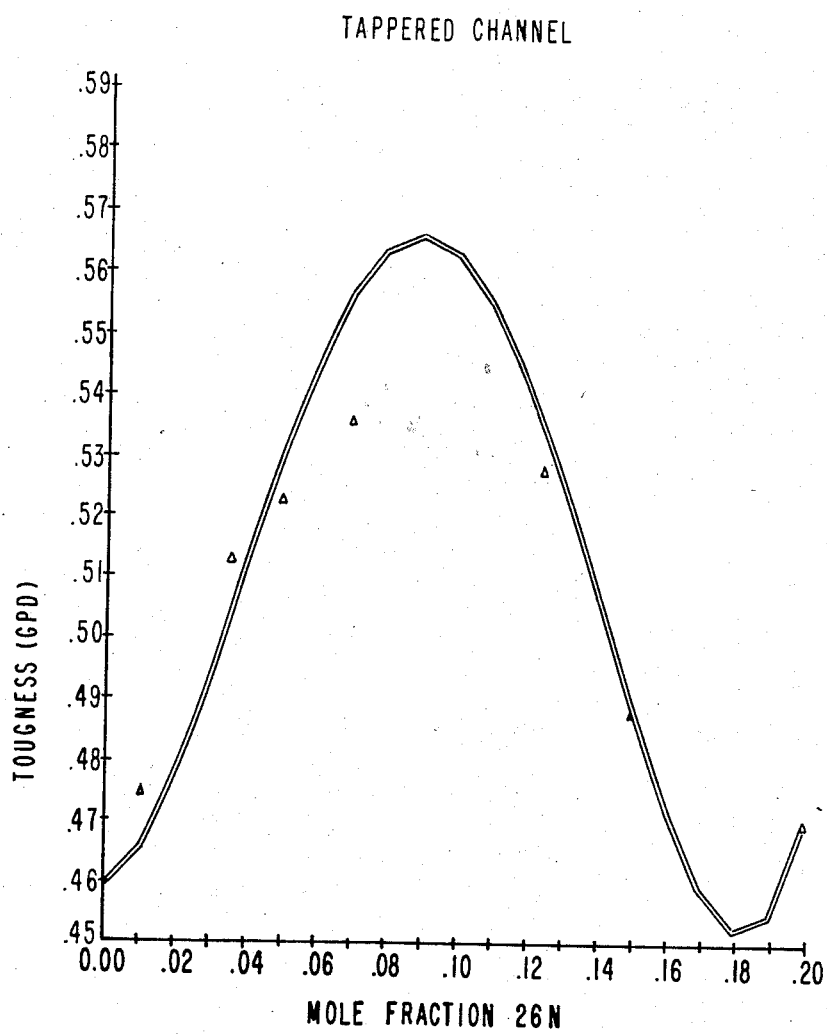

COPOLY(P-PHENYLENE TEREPHTHALAMIDE/2,6-NAPHTHALAMIDE)ARAMID YARN

FIELD OF THE INVENTION

Yarns made from fibers of aromatic polyamides, particularly poly(p-phenylene terepthalamide) (PPD-T) are known to exhibit excellent physical properties. As uses for such yarns are expanded, however, a need arises for ever-improved properties. Some uses, for example, ropes, cables, fabrics, and tire cords, require fibers with both increased tenacity and increased toughness. The present invention is concerned with yarns made from fibers of a new copolymer material which fibers have a toughness greater than the toughness of fibers of PPD-T and, at the same time, have a tenacity at least as great.

DISCUSSION OF THE PRIOR ART

U.S. Pat. No. 3,767,756 issued Oct. 23, 1973 on the application of H. Blades discloses aromatic polyamides including copolymers of paraphenylenediamine and two dicarboxylic acid comonomers. That patent also discloses an aromatic polyamide homopolymer of a para-phenylenediamine and 2,6-naphthalere dicarboxylic acid. Neither those copolymers nor the homopolymer are disclosed to yield fibers which exhibit tenacity and toughness greater than the tenacity and toughness of fibers made from PPD-T homopolymer.

Japanese Patent Application No. 45401/75 (Kokai), published Apr. 5, 1984 discloses preparation of copoly(p-phenylene terephthalamide/2,6-naphthalamide) wherein the mole fraction of 2,6-naphthalamide is 0.2. Fibers made from this copolymer are reported therein to exhibit tenacities and moduli lower than the tenacities and moduli of fibers made from PPD-T homopolymer.

SUMMARY OF INVENTION

According to this invention, there is provided a yarn made from fibers of aromatic polyamide consisting essentially of copoly(p-phenylene terephthalamide/2,6-naphthalamide) wherein the mole fraction of 2,6-naphthalamide is from 0.005 to 0.10. The tenacity of the yarn of this invention is greater than 25.7 grams per denier (gpd) (23.1 dN/tex) and the toughness of the fibers of this invention is greater than 0.417 gpd (0.375 dN/tex). The toughness of yarns made from the fibers of this invention is greater than the toughness of yarns having the same dimensions and made by the same processes, but using a homopolymer poly(p-phenylene terephthalamide). In addition, tenacity of yarns made from the fibers of this invention is at least equivalent to that of yarns made from the homopolymer.

Yarns of this invention made with the copoly(p-phenylene terephthalamide/2,6-naphthalamide) and using spinnerets having straight walled spinning capillaries, exhibit tenacity and toughness greater than the tenacity and toughness of fibers made with PPD-T homopolymer if the mole fraction of 2,6-naphthalamide is up to about 0.085. Such yarns of this invention, when made using spinnerets having tapered spinning capillaries exhibit tenacity and toughness greater than the tenacity and toughness of yarns made with PPD-T homopolymer if the mole fraction of 2,6-naphthalamide is up to about 0.094. A lower limit of 0.005 mole fraction of 2,6-naphthalamide is believed to be a practical minimum amount for the purposes of this invention.

BRIEF DESCRIPTION OF THE DRAWING

FIG. 5 is a graphical representation of the relationship between toughness and 2,6-naththalamide mole fraction using tapered spinnerets.

DETAILED DESCRIPTION OF THE INVENTION

Figure 1:
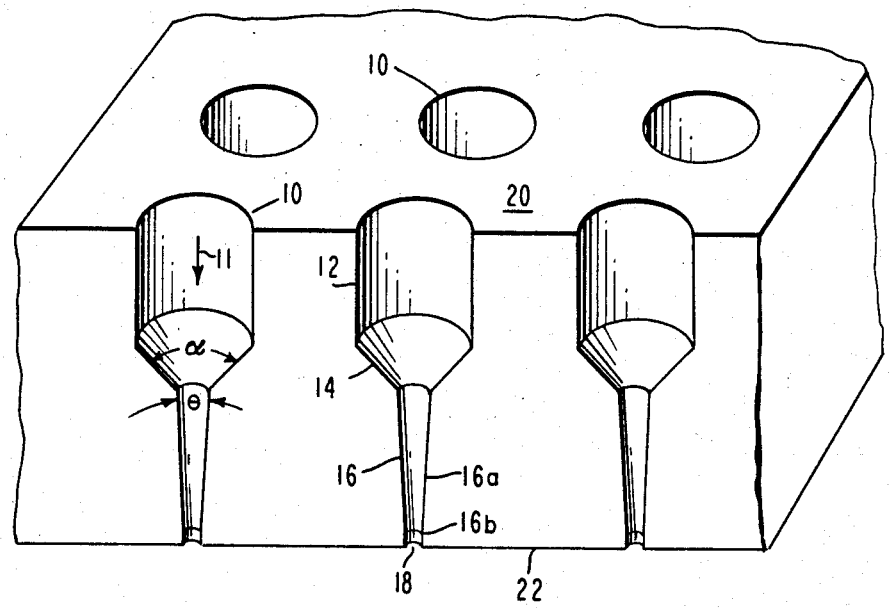
FIG. 1 is a representation of a tapered capillary spinneret useful in practice of this invention.

The polyamide of the yarn of this invention, as aforestated, is a copolymer of p-phenylene diamine and a combination of terephthaloyl chloride and 2,6-naphthalene dicarbonyl chloride. The copolymer is random and the yarns can include usually used additives such as dyes, fillers, delusterants, stabilizers, anti-oxidants and the like.

By a yarn is meant a multifilament yarn of continuous filaments or fibers each of which has a linear density of 0.5 to 6 denier/filament (dpf) (0.55 to 6.67 dtex/filament), preferably between 0.5 and 3 dpf (0.55 and 3.33 dtex/filament). Below about 0.5 dpf (0.55 dtex/filament) spinning continuity cannot be maintained at practical speeds; and above about 6 dpf (6.67 dtex/filament), the rate of solvent extraction becomes slower, resulting in structural non-uniformities across filament cross-sections and decreased tensile properties. From 3 to 6 dpf (3.33 and 6.67 dtex/filament), tensile properties also tend to diminish but remain adequate for many applications where highest tenacities are not required. Yarns have a denier of from as low as 20 (22.2 dtex) to more than 2000 (2222 dtex).

The copolymer can be conveniently made by any of the well known polymerization processes such as those taught in U.S. Pat. Nos. 3,063,966 and 3,869,429. One process for making the copolymer of this invention includes dissolving one mole of p-phenylene diamine in a solvent system comprising about one mole of calcium chloride and about 2.5 liters of N-methyl-2-pyrrolidone and then adding a blend of one mole, total, of terephthaloyl chloride and 2,6-naphthalene dicarbonyl chloride with agitation and cooling. The addition of the diacid chlorides is usually accomplished in two steps—the first addition step being about 25-35 weight percent of the total with the second addition step occurring after the system has been mixed for about 15 minutes. Cooling is applied to the system after the second addition step to maintain the temperature below about 75° C. Under forces of continued agitation, the copolymer gels and then crumbles; and, after at least thirty minutes, the resulting crumb-like copolymer is allowed to stand without agitation for several hours and is then washed several times in water and dried in an oven at about 100°-150° C. Other copolymers of this invention can be made in accordance with the process outlined above when the mole fraction of 2,6-naphthalene dicarbonyl chloride is from 0.01 to 0.10 based on total acid chlorides.

Molecular weight of the copolymer is dependent upon a multitude of conditions. For example, to obtain copolymer of high molecular weight, reactants and solvent should be free from impurities and the water content of the total reaction system should be as low as possible—at least less than 0.03 weight percent. Care should be exercised to use substantially equal moles of the diamine and the diacid chlorides in order to assure highest molecular weight copolymer.

The copolymers of this invention can also be made by continuous polymerization and other solvents can be used such as tetramethylene urea, dimethyl acetamide, hexamethyl phosphoramide, and the like, alone or in combination with N-methyl-2-pyrrolidone. While it may be preferred that inorganic salts be added to the solvent to assist in maintaining a solution of the copolymers as it is formed, quarternary ammonium salts have, also, been found to be effective in maintaining the copolymer solution. Examples of useful quarternary ammonium salts include: methyl tri-n-butyl ammonium chloride; methyl tri-n-propyl ammonium chloride; tetra-n-butyl ammonium chloride; and tetra-n-propyl ammonium chloride.

Yarns of this invention are made by extruding a dope of the copolymer by the dry-jet wet spinning processes, such as are taught, for example, in U.S. Pat. No. 3,767,756.

A dope can be prepared by dissolving an adequate amount of the copolymer in an appropriate solvent. Sulfuric acid, chlorosulfuric acid, fluorosulfuric acid and mixtures of these acids can be identified as appropriate solvents. Sulfuric acid is much the preferred solvent and should, generally, be used at a concentration of 98% by weight or greater to avoid undue degradation of the copolymer. It has been determined, however, that increasing mole fractions of 2,6-naphthalamide will permit use of less concentrated sulfuric acid. For example, at a mole fraction of 0.01, the sulfuric acid should be at least 98%; but at a mole fraction of 0.10, the sulfuric acid can be as low as 96%. The copolymer should be dissolved in the dope in the amount of at least 40, preferably more than 43 grams of copolymer per 100 milliliters of solvent. The densities, at 25° C., of the acid solvents are as follows: 98% $H_2SO_4$, 1.83 g/ml; $HSO_3Cl$, 1.79 g/ml; and $HSO_3F$, 1.74 g/ml.

Before preparation of the spinning dope, the copolymer and other ingredients should be carefully dried, preferably to less than one weight percent water; the copolymer and the solvent should be combined under dry conditions; and the dope should be stored under dry conditions. Care should be exercised to exclude atmospheric moisture. Dopes should be mixed and held in the spinning process at as low a temperature as is practical to keep them liquid in order to reduce degradation of the polymer. Exposure of the dopes to temperatures of greater than 90° C. should be minimized.

The dope, once prepared, can be used immediately or stored for future use. If stored, the dope is preferably frozen and stored in solid form in an inert atmosphere such as under a dry nitrogen blanket. If the dope is to be used immediately, it can conveniently be made continuously and fed directly to spinnerets. Continuous preparation and immediate use minimizes degradation of the copolymer in the spinning process.

The dopes are, typically, solid at room temperature. For example, a dope of 19.5 grams of the copolymer with an inherent viscosity of 6.5 and with a 2,6-naphthalamide mole fraction of 0.05 in 80.5 grams of 100% sulfuric acid may exhibit a bulk viscosity of about 1000 poises at 80° C. and solidifies to an opaque solid at about 65° C. The bulk viscosity of dopes made with a particular copolymer increases with molecular weight of the copolymer for given temperatures and concentrations.

Dopes can generally be extruded at any temperature where they are sufficiently fluid. Since the degree of degradation is dependent upon time and temperature, it is important that temperatures be below about 100° C. Temperatures below about 90° C. are preferable and temperatures of about 75° to 85° C. are usually used. If higher temperatures are required or desired for any reason, processing equipment should be designed so that the dope is exposed to the higher temperatures for a minimum time.

Dopes used to make the yarns of this invention are optically anisotropic, that is microscopic regions a dope are birefringent and a bulk sample of the dope depolarizes plane-polarized light because the light transmission properties of the microscopic regions of the dope vary with direction. It is believed to be important that the dopes used in this invention must be anisotropic, at least in part.

Among the aromatic moieties having either coaxial or opposite and parallel chain-extending bonds which have been considered for copolymerization with paraphenylene diamine and terephthaloyl chloride, 2,6-naphthaloyl chloride is unique in that, in the mol fraction range of 0.005 to 0.100 2,6-naphthalamide, tenacity of yarns made from the copolymer is at least equal to that of yarns made from PPD-T homopolymer and toughness is, generally, such greater than could be anticipated. Such comparisons are made under substantially identical conditions of preparation and using high molecular weight polymers, that is, polymers with inherent viscosities of at least 5.5 dl/g. Copolymerization is generally known as a route to increase yarn toughness, but is not usually so effective when so little comonomer is used and when there has been little or no reduction in initial tensile modulus. Surprisingly, the copolymer yarn of this invention retains the high modulus in spite of a sizable increase in toughness.

Spinnerets—Yarns of the present invention can be made with spinnerets having straight walls and, quite surprisingly, yarns having even more improvement can be made with tapered capillary spinnerets.

Reference is made to FIG. 1 wherein there is a representation in partial cross-section, of a spinneret block useful in this invention.

By "tapered capillary spinneret" is meant a spinneret having multiple openings 10 extending therethrough from entrance face 20 to exit face 22. Each opening 10 comprises, along the flow direction 11, a cylindrical counterbore 12, lead-in cone 14, and a spinning capillary 16. The spinning capillary is coaxial with lead-in cone 14 and comprises at least a conically tapered portion 16a. Spinning capillary 16 optionally includes a cylindrical exit portion 16b with an L/D of about 1.0 where L is the axial length of portion 16b and D is the diameter of its opening 18 in exit face 22. Each tapered spinning capillary of the Examples herein has a cylindrical exit portion 16b of L/D about 1.0, a total length $L_t$ (16a+16b), a diameter D (at 18), and an included angle Θ of tapered entrance portion 16a as specified in the Table below. Where the capillary type is identified as "straight", the whole capillary is cylindrical with constant diameter equal to that of final outlet opening 18. Taper angles Θ are in the range of 5 to 20 degrees with 9 to 15 degrees preferred. The total included angle α of lead-in cone 14 must exceed 30 degrees and is usually either 45 or 60 degrees for matters of convenience in tooling. The holes of opening 18 need not be round. They can be oval or slit-shaped or even square. The holes are generally round and are generally from about 0.025 to 0.13 millimeters (1-5 mils) in diameter. The length-to-diameter ratio is generally from about 1 to as much as 10.

Tests and definitions of polymer and yarn qualities useful for describing the present invention are as follow:

Inherent Viscosity (IV)—Inherent viscosity is defined by $$IV = \frac{\ln(\eta_{rel})}{c}$$

where c is concentration (0.5 g polymer or yarn in 100 ml of solvent), $\eta_{rel}$ is the ratio of the flow times of polymer solution and solvent as determined at 30° C. in a capillary viscometer. For all inherent viscosities reported herein, the solvent is concentrated sulfuric acid (95-98% by weight $H_2SO_4$).

Linear Density—The standard for linear density herein is denier (D) expressed as weight in grams of a 9000 m length and calculated from the measured weight of a shorter length (for example, 90 cm). Linear density in SI units, is dtex, and is calculated from the equation dtex = 1.111(D).

Tensile Properties (T/E/M)—Break tenacity (T), percent elongation (E), and initial modulus (M) for yarns are computed from the output of a digitized laboratory stress/strain tester according to ASTM D2101, Part 25, 1968 and as described in U.S. Pat. No. 3,869,429 from Column 10, line 60, to Column 11, line 28 using a testing rate of 50% elongation per minute. Unless otherwise indicated, "tenacity" means break tenacity of yarn and "modulus" means initial modulus of yarn. Both T and M are initially determined in units of grams per (initial) denier and are converted to SI units (dN/tex) by multiplication with 0.8838.

Toughness (To)—"Toughness" is a measure of the energy absorbing capability of a yarn up to its point of failure in stress/strain testing (same testing as for "Tensile Properties", above). The area (A) under the stress/strain curve up to the point of breaking is measured, usually employing a planimeter, to provide area in square inches. Denier (D) is as described above under "Linear Density". Toughness (To) is calculated as To = A × (FSL/CFS)(CHS/CS)(1/D)(1/GL)

where
FSL = full-scale load in grams
CFS = chart full scale in inches
CHS = crosshead speed in in/min
CS = chart speed in in/min
GL = gauge length of test specimen in inches.

Digitized stress/strain data may, of course, be fed to a computer for calculating toughness directly. The result is To in g/denier. Multiplication by 0.8838 converts to dN/tex. When the units of length are the same throughout, the above equation computes To in units determined only by those chosen for force (FSL) and D.

Density—Fiber density is determined using a density gradient tube essentially as described in ASTM D1505-68 and is well understood. The density-gradient columns are prepared as described by Tung and Taylor, *J. Poly. Sci.*, 21, 144 (1956). Carbon tetrachloride (reagent grade) and n-heptane (99%), both dried first over silica for at least 24 hours, are the solvents used. Calibrated "floats" of hollow Pyrex spheres are employed as density indicators, their calibrations being accurate to 0.0002 density units (g/ml). Neither of the two floats bracketing the fiber under test should be more than 5 cm above or below the specimen.

Snub Angle—In snubbing yarn by passing it around a pair of guides, the "snub angle" is the angular change in direction between the direction of entry of the yarn and the yarn direction while passing between the guides. For more than two guides, separate snub angles are computed for each successive pair of guides.

Spinneret Geometry—Each of the spinnerets used in the Examples herein was a 1.0 in (2.54 cm) diameter disk 0.120 in (0.305 cm) thick with forty spinning holes. Each spinning hole comprised, along the spinning direction, a 20 mil (0.508 mm) counterbore with a 45 degree (total included angle) lead-in cone through the center of which was provided the final spinning capillary. The following table describes the geometry of each spinning capillary. Diameter is for the final outlet opening and, for the Examples herein, was 2.0 mil (0.051 mm). Thus, where these capillaries are involved in the Examples, they will be identified only by Capillary No.

| Capillary No. | Capillary Geometry | | |
|---|---|---|---|
| | Type | Taper Angle Θ(deg) | Length(L_l) mil (mm) |
| 1 | straight | 0 | 4 (0.102) |
| 2 | tapered | 9 | 6.4 (0.163) |
| 3 | tapered | 15 | 30 (0.762) |
| 4 | tapered | 15 | 40 (1.016) |
| 5 | tapered | 15 | 8 (0.203) |
| 6 | tapered | 15 | 4 (0.102) |
| 7 | tapered | 15 | 60 (1.524) |
| 8 | tapered | 15 | 16 (0.406) |
| 9 | tapered | 9 | 4 (0.102) |
| 10 | tapered | 9 | 16 (0.406) |
| 11 | tapered | 9 | 8 (0.203) |

DESCRIPTION OF PREFERRED EMBODIMENTS

In the examples which follow, there are descriptions of many of the preferred embodiments of this invention. Fibers are spun using spinning dopes of copoly(p-phenylene terephthalamide/2,6-naphthalamide) within and outside the scope of this invention and, as comparisons, using spinning dopes of PPD-T homopolymer. In order to maintain an appropriate basis for comparision, all spinning dopes in all of the examples of this invention were kept at a polymer solids concentration within the same range as the polymer solids concentration of the dopes using PPD-T homopolymer. The range of homopolymer PPD-T polymer solids concentrations which were used to spin fibers is rather limited, from 19.4 to 20.1%, by weight, based on the total spinning dope system. It should be recognized that the copolymers of this invention are more soluble than PPD-T in the dope solvent system and can, therefore, successfully be used in higher concentrations in spinning dopes.

Tenacity and toughness values for fibers made in the following examples were determined and are reported in tables which are a part of the examples and are, also, set out in the graphs which form a part of FIGS. 2-5. In the examples, several spinning runs were often made at a given set of spinning conditions and, for the purpose of the graphs, an average of the fiber properties for each run was used for each point in the Figs.

Figure 2:
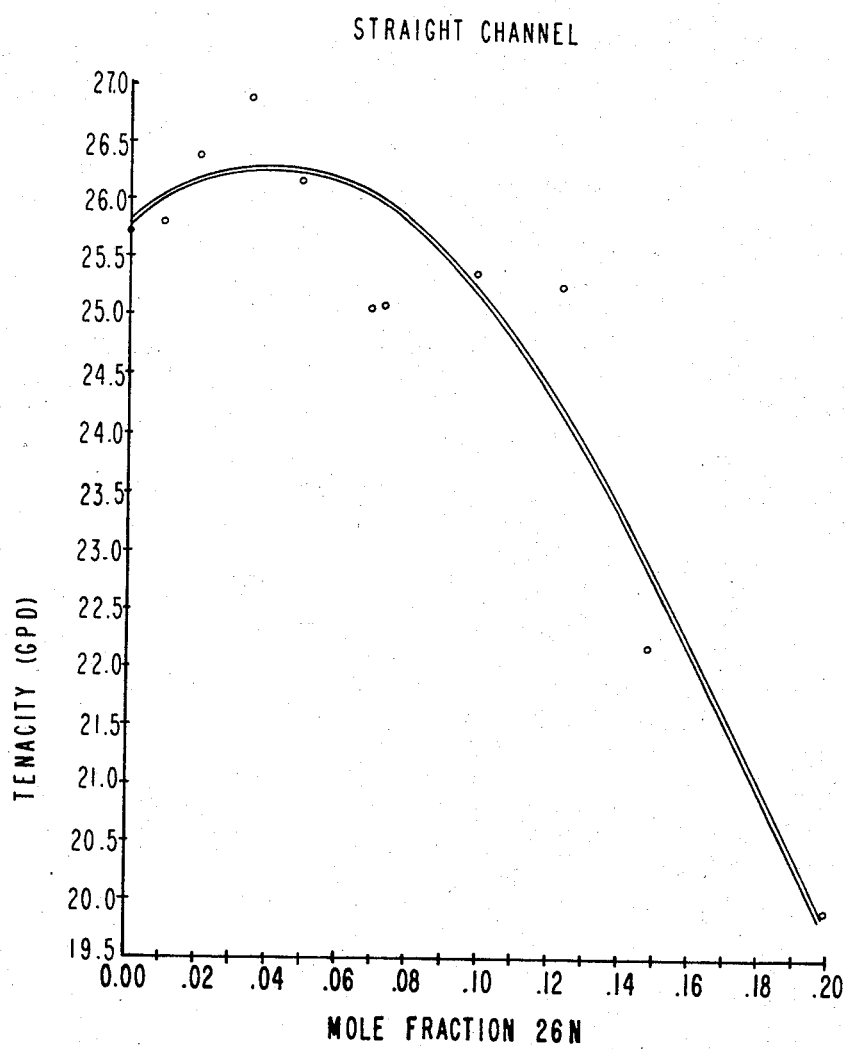
FIG. 2 is a graphical representation of the relationship between tenacity and 2,6-naphthalamide mole fraction using a straight-walled spinneret.

Data points in FIG. 2 were taken from Examples 1, 2, and 3 and the curve shown is a fourth-order regression fit to the data. For fibers made using straight channel spinnerets in these examples, the homopolymer PPD-T exhibits a tenacity of 25.7 gpd. Tenacities for fibers made using the copolymer increase to about 26.7 gpd at 0.04 mole fraction 26N and then decrease to the homopolymer value at 0.085 mole fraction 26N.

Figure 3:
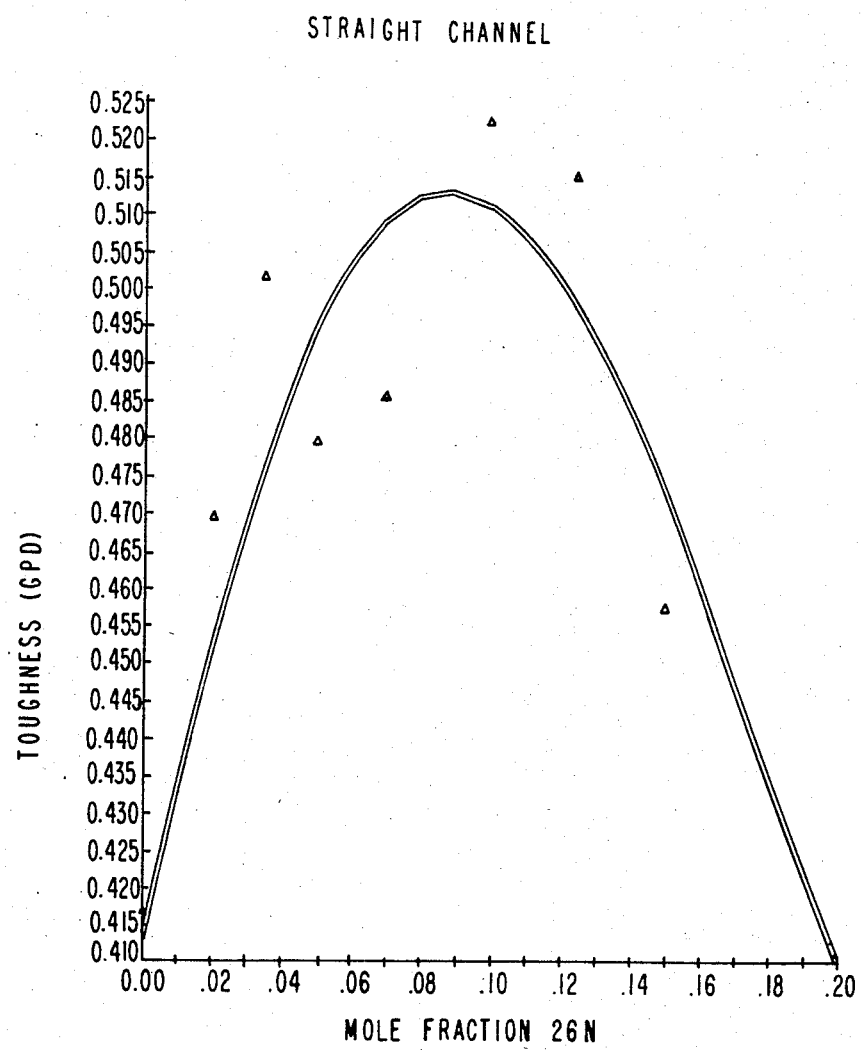
FIG. 3 is a graphical representation of the relationship between toughness and 2,6-naphthalamide mole fraction using a straight-walled spinneret.

Data points in FIG. 3 were, also, taken from Examples 1, 2, and 3 and the curve shown is a fourth-order regression fit to the data. For fibers made using straight channel spinnerets in these examples, the homopolymer PPD-T exhibits a toughness of 0.412. Toughnesses for fibers made using the copolymer increase to about 0.513 at 0.085 mole fraction 26N and then decrease to the homopolymer value at 0.20 mole fraction 26N.

Figure 4:
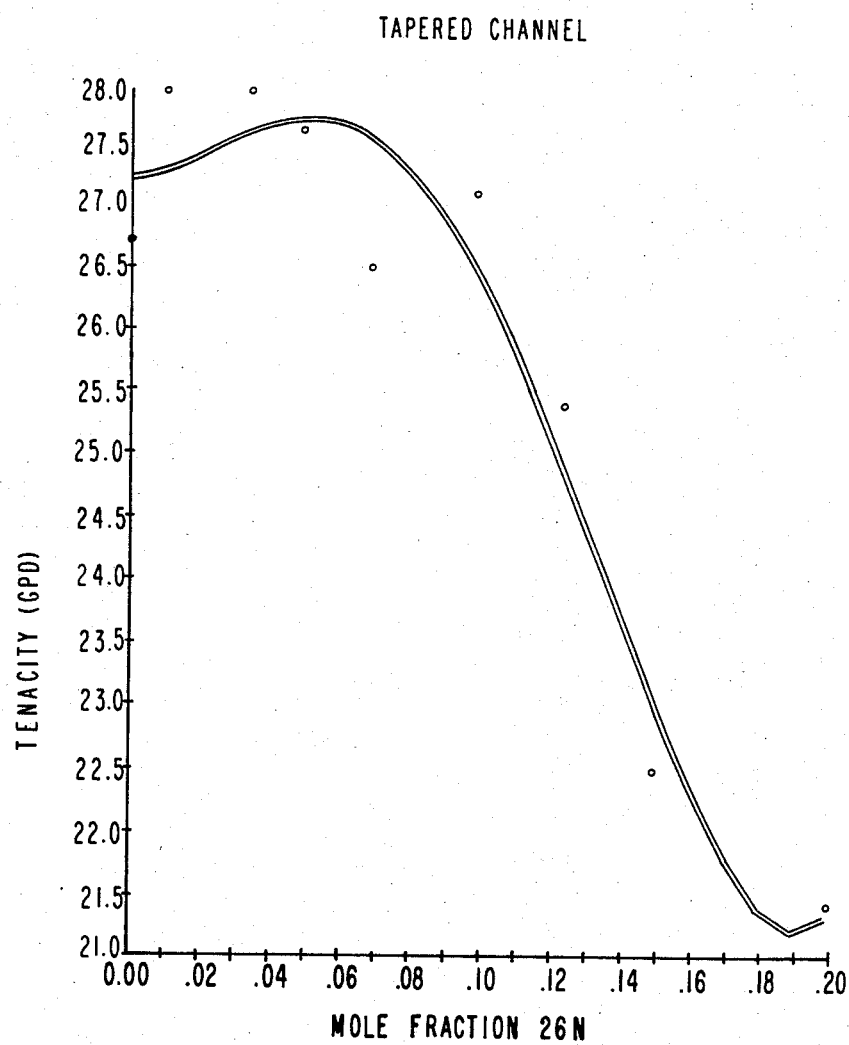
FIG. 4 is a graphical representation of the relationship between tenacity and 2,6-naphthalamide mole fraction using tapered spinnerets.

Data points in FIG. 4 were taken from Examples 5, 6, and 7 and the curve shown is a fourth-order regression fit to the data. For fibers made using tapered spinnerets in these examples, the homopolymer PPD-T exhibits a tenacity of 26.7 gpd. Tenacities for fibers made using the copolymer increase to about 27.8 gpd at 0.04 mole fraction 26N and then decrease to the homopolymer value at 0.093 mole fraction 26N.

Data points in FIG. 5 were, also, taken from Examples 5, 6, and 7 and the curve shown is a fourth-order regression fit to the data. For fibers made using tapered spinnerets in these examples, the homopolymer PPD-T exhibits a toughness of 0.460. Toughnesses for fibers made using the copolymer increase to about 0.562 at 0.090 mole fraction 26N and then decrease to the homopolymer value at 0.175 mole fraction 26N.

EXAMPLE A

Polymer Preparation

In this example, copolymers were made using mole fractions of 2,6-naphthalamide ranging from 0.01 to 0.20, and para-phenylene terephthalamide homopolymer was made for testing as a control. Table 1 represents tabulations of the specific amounts of ingredients in each polymerization run.

To make the polymer, a vessel equipped for agitation, cooling, and nitrogen flush was charged with dry N-methyl-2-pyrrolidone (NMP) and dry calcium chloride and the charge was stirred for about 15 minutes at about 12° C. The p-phenylene diamine (PPD) was added and stirring was continued for about three hours without additional cooling to dissolve the PPD. That solution was cooled to about 5° C. and, with continued cooling and vigorous agitation, about 35 percent of the total terephthaloyl chloride (TCl) and 2,6-naphthaloyl chloride (2,6NCl) was added in about 10 minutes to make a prepolymer. After continued vigorous agitation for about 5 minutes and no further cooling, the remainder of the acid chloride was added and stirred for 7-10 minutes with cooling to maintain a temperature of less than 75° C. until the system gelled and crumbled. The gelled mass was stirred and chopped for about 60 minutes with cooling sufficient to keep the temperature below 75° C.; and the resulting mass of crumbs was allowed to sit about 16 hours before further processing.

The mass of crumbs was washed free of NMP and salts by mixing the mass with 20-30 exchanges of soft water and adjusting the last wash to pH 7 before draining. The crumbs of polymer were dried in an oven at 105° C. Inherent viscosity of the bulk polymer was determined and is reported in Table 1.

TABLE 1

| Polymer Item | NMP (lit) | CaCl$_2$ (moles) | PPD (moles) | TCl (moles) | 26 NCl (moles) | Mole Fraction 26 N | Bulk Polymer I.V. |
|---|---|---|---|---|---|---|---|
| 1A | 53.7 | 27.25 | 22.75 | 22.84 | 0.00 | 0.00 | 7.1 |
| 2A | 50.7 | 30.62 | 25.56 | 25.56 | 0.00 | 0.00 | 7.4 |
| 3A | 53.7 | 30.65 | 25.55 | 25.56 | 0.00 | 0.00 | 7.5 |
| 4A | 53.7 | 30.65 | 25.55 | 25.56 | 0.00 | 0.00 | 7.2 |
| 5A | 53.7 | 30.62 | 25.56 | 25.56 | 0.00 | 0.00 | 8.2 |
| 6A | 53.7 | 30.65 | 25.55 | 25.31 | 0.26 | 0.01 | 5.9 |
| 7A | 53.7 | 30.65 | 25.55 | 25.31 | 0.26 | 0.01 | 7.9 |
| 8A | 53.7 | 30.65 | 25.55 | 25.31 | 0.26 | 0.01 | 7.5 |
| 9A | 53.7 | 30.65 | 25.55 | 25.31 | 0.26 | 0.01 | 7.6 |
| 10A | 53.7 | 30.65 | 25.55 | 25.31 | 0.26 | 0.01 | 8.0 |
| 11A | 53.7 | 30.65 | 25.55 | 25.31 | 0.26 | 0.01 | 8.2 |
| 12A | 20.8 | 10.02 | 10.00 | 9.80 | 0.20 | 0.02 | 6.3 |
| 13A | 40.1 | 15.00 | 15.01 | 14.47 | 0.53 | 0.035 | 6.4 |
| 14A | 43.1 | 20.00 | 20.02 | 19.30 | 0.70 | 0.035 | 7.8 |
| 15A | 20.8 | 10.02 | 10.01 | 9.50 | 0.50 | 0.05 | 7.0 |
| 16A | 53.7 | 30.65 | 25.55 | 24.26 | 1.28 | 0.05 | 7.1 |
| 17A | 53.7 | 24.00 | 20.03 | 19.00 | 1.00 | 0.05 | 7.6 |
| 18A | 53.7 | 30.65 | 25.55 | 24.26 | 1.28 | 0.05 | 8.2 |
| 19A | 53.7 | 30.65 | 25.55 | 24.26 | 1.28 | 0.05 | 5.3 |
| 20A | 53.7 | 24.87 | 25.55 | 24.38 | 1.28 | 0.05 | 6.8 |
| 21A | 46.9 | 15.05 | 15.01 | 13.95 | 1.06 | 0.07 | 6.5 |
| 22A | 46.9 | 12.01 | 15.01 | 13.95 | 1.06 | 0.07 | 6.5 |
| 23A | 53.7 | 10.65 | 25.55 | 22.99 | 2.57 | 0.10 | 7.2 |
| 24A | 44.7 | 10.03 | 10.00 | 9.00 | 1.01 | 0.10 | 7.2 |
| 25A | 56.8 | 12.00 | 12.00 | 10.80 | 1.21 | 0.10 | 7.3 |
| 26A | 56.8 | 10.02 | 10.01 | 9.00 | 1.01 | 0.10 | 7.4 |
| 27A | 56.8 | 10.03 | 10.00 | 9.00 | 1.01 | 0.10 | 7.7 |
| 28A | 56.8 | 10.02 | 10.01 | 9.00 | 1.01 | 0.10 | 8.7 |
| 29A | 56.8 | 10.03 | 10.01 | 9.00 | 1.01 | 0.10 | 8.2 |
| 30A | 56.8 | 12.00 | 12.01 | 10.80 | 1.21 | 0.10 | 7.4 |
| 31A | 53.7 | 30.65 | 25.56 | 22.99 | 2.57 | 0.10 | 7.9 |
| 32A | 25.4 | 14.40 | 12.01 | 10.80 | 1.21 | 0.10 | 6.2 |
| 33A | 56.8 | 10.03 | 10.01 | 9.00 | 1.01 | 0.10 | 6.8 |

TABLE 1-continued

| Polymer Item | NMP (lit) | CaCl₂ (moles) | PPD (moles) | TCl (moles) | 26 NCl (moles) | Mole Fraction 26 N | Bulk Polymer I.V. |
|---|---|---|---|---|---|---|---|
| 34A | 33.3 | 20.70 | 17.26 | 15.09 | 2.17 | 0.125 | 5.6 |
| 35A | 33.3 | 20.70 | 17.26 | 14.66 | 2.60 | 0.15 | 5.2 |
| 36A | 53.7 | 30.65 | 25.55 | 21.71 | 3.85 | 0.15 | 6.1 |
| 37A | 53.7 | 30.65 | 25.55 | 20.43 | 5.13 | 0.20 | 6.3 |

EXAMPLE B

Spin Dope Preparation

In this example, polymers from Example A were used to make spinning dopes by adding the crumbs of polymer to frozen sulfuric acid snow maintained at a temperature of $-10°$ to $-15°$ C. The sulfuric acid had a concentration of 99.5 to 100.05 and was contained in a jacketed, closeable, mixer having twin blades in a conical-helical configuration and an exit gear pump. The mixer was sealed and started and the mixing was continued for about 2 hours while the temperature was raised to about 80° C. The resulting solution was degassed under a vacuum for about 1½ hours and, before spinning, a sample was removed, weighed, coagulated and well washed in water, dried in a vacuum oven and weighed to determine the polymer solids as percent polymer in the dope. Table 2 represents a tabulation of the weights of solvent and polymer in each dope and which of the polymers from Example A were used.

TABLE 2

| Solution Item | Polymer Item | Sulfuric Acid (weight parts) | Polymer (weight parts) | Polymer Solids (%) |
|---|---|---|---|---|
| Spinning Solutions PPD-T | | | | |
| 1B | 2A | 6.1 | 1.5 | 19.5 |
| 2B | 2A | 5.1 | 1.2 | 19.9 |
| 3B | 5A | 8.1 | 2.0 | 20.0 |
| 4B | 5A | 11.8 | 2.9 | 19.5 |
| 5B | 5A | 8.1 | 2 | 20.1 |
| 6B | 1A | 6.0 | 1.5 | 19.8 |
| 7B | 3A | 8.1 | 2.0 | 19.4 |
| 8B | 4A | 8.1 | 2.0 | 19.5 |
| 9B | 3A | 10.2 | 2.5 | 19.6 |
| Spinning Solutions 2,6-naphthalamide/terephthalamide (26 N/T) (0.01/0.99) | | | | |
| 10B | 10A | 6.0 | 1.5 | 19.9 |
| 11B | 10A | 6.1 | 1.5 | 19.7 |
| 12B | 8A | 8.1 | 2.0 | 19.7 |
| 13B | 11A | 8.1 | 2.0 | 20.0 |
| 14B | 6A | 6.0 | 1.5 | 19.7 |
| 15B | 7A | 8.1 | 2.0 | 20.0 |
| 16B | 11A | — | — | 20.0 |
| 17B | 9A | 8.0 | 2.0 | 19.5 |
| 18B | 9A | 8.1 | 2.0 | 19.5 |
| 19B | 10A | 6.1 | 1.5 | 19.9 |
| 20B | 10A | 6.0 | 1.5 | 19.4 |
| Spinning Solutions 26 N/T (0.02/0.98) | | | | |
| 21B | 12A | 4.9 | 1.2 | 19.9 |
| 22B | 12A | 5.2 | 1.3 | 19.7 |
| 23B | 12A | 4.8 | 1.2 | 19.8 |
| Spinning Solutions 26 N/T (0.035/0.965) | | | | |
| 24B | 13A | 6.1 | 1.5 | 20.1 |
| 25B | 14A | 6.1 | 1.5 | 20.0 |
| Spinnning Solutions 26 N/T (0.05/0.95) | | | | |
| 26B | 15A | 5.2 | 1.3 | 19.8 |
| 27B | 17A | 6.1 | 1.5 | 19.5 |
| 28B | 18A | 6.1 | 1.5 | 19.6 |
| 29B | 17A | 6.1 | 1.5 | 19.6 |
| 30B | 17A | 10.1 | 2.5 | 19.6 |
| 31B | 17A | 6.1 | 1.5 | 19.4 |
| 32B | 16A | 8.1 | 2.0 | 19.8 |
| 33B | 17A | 6.1 | 1.5 | 19.8 |
| 34B | 19A | 8.1 | 2.0 | 19.5 |
| 35B | 18A | 6.1 | 1.5 | 19.6 |
| 36B | 20A | 5.2 | 1.3 | 19.8 |
| Spinning Solutions 26 N/T (0.07/0.93) | | | | |
| 37B | 21A | 5.8 | 1.5 | 20.1 |
| 38B | 21A | 6.0 | 1.5 | 20.1 |
| 39B | 22A | 8.1 | 2.0 | 19.5 |
| Spinning Solutions 26 N/T (0.1/0.9) | | | | |
| 40B | 28A | 6.0 | 1.5 | 19.8 |
| 41B | 26A | 5.0 | 1.3 | 19.6 |
| 42B | 29A | 3.8 | 1.0 | 19.6 |
| 43B | 27A | 4.6 | 1.2 | 20.1 |
| 44B | 30A | 6.1 | 1.5 | 19.6 |
| 45B | 24A | 6.0 | 1.5 | 20.1 |
| 46B | 30A | 5.8 | 1.5 | 19.8 |
| 47B | 23A | 8.1 | 2.0 | 19.7 |
| 48B | 25A | 5.8 | 1.5 | 20.1 |
| 49B | 31A | 8.1 | 2.0 | 19.8 |
| 50B | 32A | 6.1 | 1.5 | 19.6 |
| 51B | 30A | 6.0 | 1.5 | 19.4 |
| 52B | 33A | 6.1 | 1.5 | 19.8 |
| Spinning Solutions 26 N/T (0.125/0.875) | | | | |
| 53B | 34A | 8.0 | 2.0 | 19.8 |
| Spinning Solutions 26 N/T (0.15/0.85) | | | | |
| 54B | 36A | 8.0 | 2.0 | 19.4 |
| 55B | 35A | 7.1 | 2.0 | 19.6 |
| Spinning Solutions 26 N/T (0.2/0.8) | | | | |
| 56B | 37A | 8.0 | 2.0 | 20.0 |

EXAMPLE C

Spinning Yarns

In this example, spin dopes from Example B were used to spin yarns by pumping the hot spin dopes from the mixer through heated transfer lines and through a spinning block heated to about 75° to 85° C. at a rate of about 6 grams per minute. The dope was extruded downwardly from a 2.5 cm spinneret, through a 0.5 cm air gap, into a constantly replenished cold (about 0°-8° C.) water bath having an attached vertical spin tube (1.9 cm I.D. with an entry constriction of 0.64 cm I.D.; 30.5 cm length) which extends up into the bath to about 3.2 cm below the water surface. The partially coagulated extrudate passed through the 3.2 cm of water and then entered the spin tube along with a portion of the cold bath water. The quenched threadline then passed under a ceramic rod about 63.5 cm from the spin tube exit to direct the threadline to three successive sets of wash-/neutralization rolls driven at about 183 mpm. The yarn traveled about 76 cm from the ceramic rod to the first set of wash rolls on which the yarn was sprayed with water to remove nearly all sulfuric acid. On the second set of rolls, the yarn was sprayed with dilute (0.5%) NaOH to neutralize any residual sulfuric acid. Finally, on the third set of rolls the yarn was sprayed again with water to remove salts. The purified yarn was wound on a bobbin and dried at room temperature.

EXAMPLE 1

In this example the homopolymer dopes of Example B were spun by the procedure of Example C into homopolymer yarns using a straight channel spinneret (Capillary No. 1). Product properties from the various dopes are listed in Table 3.

TABLE 3

| Item | Spin Solution | T | E | M | To | Denier | Yarn I.V. |
|---|---|---|---|---|---|---|---|
| 1-1 | 1B | 27.0 | 3.4 | 816 | .443 | 62.0 | 6.7 |
| 1-2 | 2B | 24.8 | 3.2 | 798 | .377 | 60.0 | 6.7 |
| 1-3 | 3B | 26.1 | 3.4 | 733 | .432 | 66.0 | 5.8 |
| 1-4 | 7B | 25.3 | 3.5 | 633 | .410 | 64.0 | 6.4 |
| 1-5 | 4B | 25.1 | 3.3 | 750 | .396 | 64.5 | 6.1 |
| 1-6 | 5B | 25.6 | 3.5 | 752 | .441 | 65.0 | 5.3 |
| 1-7 | 6B | 24.5 | 3.3 | 775 | .393 | 67.9 | 5.5 |
| 1-8 | 8B | 25.5 | 3.5 | 695 | .425 | 63.0 | 6.4 |
| 1-9 | 9B | 27.1 | 3.4 | 799 | .440 | 61.0 | 6.7 |
| Average | | 25.7 | 3.4 | 750 | .417 | | |

EXAMPLE 2

In this example the spinning solutions of Example B from copolymers having 0.01 to 0.125 mole fraction 26N were spun using a straight channel spinneret (Capillary No 1) by the procedure of example C. Yarn properties are listed in Table 4.

TABLE 4

| Item | Spin Solution | T | E | M | To | Denier | Yarn I.V. |
|---|---|---|---|---|---|---|---|
| 0.010 Mole Fraction 2,6-naphthalamide (26 N) | | | | | | | |
| 2-1 | 16B | 24.9 | 3.1 | 768 | .376 | 64.0 | 6.4 |
| 2-2 | 17B | 28.1 | 3.7 | 730 | .479 | 60.6 | 6.5 |
| 2-3 | 10B | 25.6 | 3.4 | 753 | .418 | 64.6 | 6.1 |
| 2-4 | 11B | 25.1 | 3.3 | 784 | .401 | 58.0 | 6.8 |
| 2-5 | 12B | 25.9 | 3.3 | 756 | .414 | 61.5 | 6.3 |
| 2-6 | 13B | 25.7 | 3.4 | 735 | .422 | 61.9 | 6.5 |
| 2-7 | 15B | 23.8 | 3.2 | 699 | .365 | 61.0 | 6.4 |
| 2-8 | 18B | 27.0 | 3.3 | 752 | .419 | 63.0 | 6.6 |
| Average | | 25.8 | 3.3 | 747 | .412 | | |
| 0.020 Mole Fraction 26 N | | | | | | | |
| 2-9 | 21B | 28.1 | 3.8 | 677 | .503 | 62.0 | 5.8 |
| 2-10 | 22B | 26.4 | 3.9 | 584 | .487 | 64.0 | — |
| 2-11 | 23B | 24.8 | 3.7 | 590 | .421 | 61.4 | 6.8 |
| Average | | 26.4 | 3.8 | 617 | .470 | | |
| 0.035 Mole Fraction 26 N | | | | | | | |
| 2-12 | 24B | 27.4 | 3.9 | 637 | .494 | 55.0 | — |
| 2-13 | 25B | 26.3 | 3.9 | 715 | .510 | 66.4 | 5.6 |
| Average | | 26.9 | 3.9 | 676 | .502 | | |
| 0.050 Mole Fraction 26 N | | | | | | | |
| 2-14 | 26B | 28.3 | 3.8 | 733 | .520 | 62.2 | 5.9 |
| 2-15 | 27B | 25.3 | 3.8 | 671 | .457 | 63.0 | 6.7 |
| 2-16 | 28B | 27.4 | 4.0 | 718 | .526 | 60.0 | 6.6 |
| 2-17 | 29B | 26.4 | 3.7 | 755 | .486 | 62.0 | 6.6 |
| 2-18 | 30B | 24.5 | 3.8 | 636 | .440 | 63.0 | 6.5 |
| 2-19 | 31B | 25.1 | 3.7 | 682 | .452 | 62.0 | 6.5 |
| Average | | 26.2 | 3.8 | 699 | .480 | | |
| 0.070 Mole Fraction 26 N | | | | | | | |
| 2-20 | 37B | 25.5 | 3.9 | 791 | .493 | 63.0 | — |
| 2-21 | 38B | 26.1 | 3.9 | 779 | .501 | 71.6 | 5.9 |
| 2-22 | 39B | 23.7 | 4.0 | 646 | .465 | 59.0 | 5.6 |
| Average | | 25.1 | 3.9 | 739 | .486 | | |
| 0.100 Mole Fraction 26 N | | | | | | | |
| 2-23 | 40B | 28.3 | 4.3 | 817 | .606 | 60.4 | 6.6 |
| 2-24 | 41B | 24.2 | 4.1 | 733 | .492 | 73.0 | 6.5 |
| 2-25 | 42B | 30.3 | 4.4 | 811 | .660 | 51.2 | 6.8 |
| 2-26 | 43B | 24.0 | 3.9 | 734 | .474 | 79.0 | — |
| 2-27 | 44B | 25.5 | 4.5 | 726 | .564 | 66.7 | 6.1 |
| 2-28 | 45B | 21.7 | 3.5 | 817 | .407 | 67.4 | 5.2 |
| 2-29 | 46B | 22.1 | 3.7 | 758 | .419 | 63.8 | 5.9 |
| 2-30 | 47B | 25.5 | 4.1 | 770 | .520 | 61.0 | 6.3 |
| 2-31 | 48B | 27.4 | 4.2 | 811 | .568 | 64.0 | 6.1 |
| Average | | 25.4 | 4.1 | 775 | .523 | | |

EXAMPLE 3

In this example the spinning solutions of Example B having 0.15 and 0.20 mole fraction 26N were spun using a straight channel spinneret (Capillary No. 1). The spinning procedure of Example C was used except that the yarn had to be passed through snubbing pins to place sufficient tension on the threadline to give stability or the wash rolls and allow continuous operation. Some dopes could be spun for a short period of time with no snubbing or only slight snubbing (<90°), but others required substantial (>90°) snubbing to obtain good spinning continuity. These latter spins are indicated by (S) in Table 5. Yarn properties are listed in Table 5. Average tenacity values are well below 25 gpd.

TABLE 5

| Item | Spin Solution | T | E | M | To | Denier | Yarn I.V. |
|---|---|---|---|---|---|---|---|
| 0.125 Mole Fraction 26 N | | | | | | | |
| 3-1 | 53B | 25.1 | 4.1 | 755 | .513 | 68.0 | 5.4 |
| 3-2 (S) | 53B | 25.5 | 4.0 | 775 | .518 | 69.0 | 4.2 |
| Average | | 25.3 | 4.1 | 765 | .516 | | |
| 0.150 Mole Fraction 26 N | | | | | | | |
| 3-3 | 54B | 21.9 | 4.1 | 724 | .460 | 62.0 | 4.8 |
| 3-4 (S) | 54B | 22.4 | 3.9 | 776 | .455 | 61.0 | 4.8 |
| Average | | 22.2 | 4.0 | 750 | .458 | | |
| 0.200 Mole Fraction 26 N | | | | | | | |
| 3-5 (S) | 56B | 19.9 | 3.9 | 860 | .412 | 64.0 | 4.5 |
| Average | | 19.9 | 3.9 | 860 | .412 | | |

EXAMPLE 4

In this example a homopolymer dope, 2B of Example B, was spun through several tapered channel spinnerets by the procedure of Example C. Yarn properties are listed below for yarn made using each spinneret. These were combined to obtain average properties for the yarns. Yarn properties are listed in Table 6.

TABLE 6

| Item | Capillary No. | T | E | M | To | Denier |
|---|---|---|---|---|---|---|
| 4-1 | 3 | 27.5 | 3.4 | 908 | .450 | 60.0 |
| 4-2 | 4 | 26.5 | 3.4 | 885 | .431 | 58.0 |
| 4-3 | 5 | 27.0 | 3.4 | 869 | .446 | 59.0 |
| 4-4 | 6 | 27.4 | 3.5 | 813 | .455 | 59.0 |
| 4-5 | 7 | 25.5 | 3.3 | 810 | .410 | 60.0 |
| 4-6 | 8 | 25.1 | 3.2 | 836 | .405 | 59.0 |
| 4-7 | 9 | 26.9 | 3.4 | 872 | .445 | 59.0 |
| 4-8 | 10 | 26.3 | 3.3 | 794 | .416 | 60.0 |
| 4-9 | 2 | 26.7 | 3.3 | 837 | .427 | 60.0 |
| Average | | 26.5 | 3.4 | 847 | .432 | 59.3 |

EXAMPLE 5

In this example homopolymer dopes of Example B were spun through tapered channel spinnerets by the procedure of Example C. Values of yarn properties obtained with the several spinnerets for each dope were determined and the overall averages for all spins using all of the dopes were, also determined. Yarn properties are listed in Table 7.

TABLE 7

| Item | Spin Soln. | Capillary No. | T | E | M | To | D |
|---|---|---|---|---|---|---|---|
| 5-1 | 7B | 8 | 26.9 | 3.7 | 670 | 0.464 | 64.0 |
| 5-2 | 9B | 2 | 27.8 | 3.6 | 750 | 0.470 | 61.0 |
| 5-3 | 8B | 8 | 28.9 | 3.7 | 749 | 0.504 | 62.7 |
| 5-4 | 1B | 2 | 27.1 | 3.3 | 844 | 0.443 | 61.2 |
| 5-5 | 2B | 2 through 10 | 26.5 | 3.4 | 847 | 0.432 | 59.3 |
| 5-6 | 3B | 2 through 9 | 26.5 | 3.6 | 716 | 0.451 | 65.9 |
| 5-7 | 5B | 2, 3, 5, 8 | 26.4 | 3.6 | 751 | 0.464 | 62.5 |
| 5-8 | 6B | 2, 3, 5, 7, 8 | 23.7 | 3.3 | 731 | 0.383 | 68.7 |
| | Overall Average | | 26.7 | 3.5 | 757 | 0.451 | |

EXAMPLE 6

In this example the spinning solutions of Example B from copolymers having 0.01 to 0.125 mole fraction 26N were spun through various tapered channel spinnerets by the procedure of Example C. Average values of yarn properties obtained with the several spinnerets from each dope were determined and the overall averages for all spins using all of the dopes were, also, determined. Yarn properties are listed in Table 8.

TABLE 8

| Item | Spin Soln. | Capillary No. | T | E | M | To | D |
|---|---|---|---|---|---|---|---|
| | | 0.01 Mole Fraction 26 N | | | | | |
| 6-1 | 10B | 2 through 8 | 29.5 | 3.8 | 796 | .535 | 65.0 |
| 6-2 | 11B | 3 through 5, 7, 8 | 27.9 | 3.5 | 788 | .472 | 60.9 |
| 6-3 | 14B | 2 through 5, 7, 8 | 26.5 | 3.0 | 957 | .397 | 63.4 |
| 6-4 | 15B | 8 | 27.2 | 3.7 | 670 | .477 | 62.0 |
| 6-5 | 18B | 8 | 26.8 | 3.7 | 620 | .451 | 63.0 |
| 6-6 | 19B | 3 through 5, 8 through 11 | 29.1 | 3.7 | 784 | .512 | 65.3 |
| 6-7 | 20B | 3, 5 | 28.4 | 3.5 | 813 | .483 | 61.9 |
| | Overall Average | | 27.9 | 3.6 | 775 | .475 | |
| | | 0.035 Mole Fraction 26 N | | | | | |
| 6-8 | 24B | 2 | 27.4 | 4.0 | 592 | .498 | 59.6 |
| 6-9 | 25B | 2, 3 | 28.4 | 3.7 | 849 | .528 | 62.3 |
| | Overall Average | | 27.9 | 3.9 | 721 | .513 | |
| | | 0.05 Mole Fraction 26 N | | | | | |
| 6-10 | 27B | 3, 5 | 29.6 | 4.0 | 744 | .573 | 60.0 |
| 6-11 | 28B | 3, 5, 7 | 28.3 | 3.9 | 773 | .543 | 62.3 |
| 6-12 | 29B | 3 through 5, 7, 8 | 29.0 | 4.0 | 717 | .568 | 62.1 |
| 6-13 | 30B | 3 through 8 | 27.9 | 3.7 | 764 | .510 | 57.3 |
| 6-14 | 31B | 3 through 8 | 26.7 | 3.7 | 756 | .482 | 59.4 |
| 6-15 | 33B | 2, 3, 5, 7 | 28.2 | 3.8 | 817 | .523 | 57.3 |
| 6-16 | 34B | 3, 8 | 23.5 | 3.5 | 678 | .422 | 63.9 |
| 6-17 | 35B | 2 | 26.0 | 4.1 | 668 | .510 | 63.0 |
| 6-18 | 36B | 2, 3 | 29.5 | 4.0 | 799 | .575 | 59.2 |
| | Overall Average | | 27.6 | 3.9 | 746 | .523 | |
| | | 0.07 Mole Fraction 26 N | | | | | |
| 6-19 | 37B | 2 | 25.4 | 3.9 | 763 | .490 | 57.0 |
| 6-20 | 38B | 2 | 29.6 | 4.2 | 805 | .624 | 67.6 |
| 6-21 | 39B | 2 through 8 | 24.5 | 4.1 | 682 | .495 | 62.2 |
| | Overall Average | | 26.5 | 4.1 | 750 | .536 | |
| | | 0.10 Mole Fraction 26 N | | | | | |
| 6-22 | 45B | 3 | 26.9 | 4.3 | 806 | .588 | 62.2 |
| 6-23 | 46B | 5 | 25.6 | 4.0 | 770 | .519 | 60.0 |
| 6-24 | 47B | 5, 6, 8 | 27.6 | 4.4 | 749 | .593 | 60.7 |
| 6-25 | 43B | 2 | 28.0 | 4.3 | 780 | .589 | 74.2 |
| 6-26 | 44B | 2 | 26.9 | 4.6 | 723 | .611 | 65.8 |
| 6-27 | 49B | 5, 6, 8 | 29.2 | 4.3 | 808 | .624 | 53.7 |
| 6-28 | 50B | 2 | 25.2 | 4.3 | 757 | .544 | 65.0 |
| 6-29 | 48B | 2 | 29.9 | 4.1 | 793 | .658 | 61.8 |
| 6-30 | 51B | 3 | 27.0 | 4.4 | 778 | .590 | 60.6 |
| 6-31 | 52B | 2, 8 | 25.1 | 4.6 | 724 | .570 | 58.5 |

TABLE 8-continued

| Item | Spin Soln. | Capillary No. | T | E | M | To | D |
|---|---|---|---|---|---|---|---|
| | Overall Average | | 27.1 | 4.3 | 769 | .589 | |

EXAMPLE 7

In this example the spinning solutions of Example B having 0.15 and 0.20 mole fraction 26N were spun using tapered channel spinnerets. The spinning procedure of Example C was used except that the yarn had to be passed through snubbing pins to place sufficient tension on the threadline to give stability on the wash rolls and allow continuous operation. Some dopes could be spun for a short period of time with no snubbing or only slight snubbing (<90°), but others required substantial (>90°) snubbing to obtain good spinning continuity. These latter spins are indicated by (S) in Table 9. Average values of yarn properties obtained with the several spinnerets from each dope were determined and the overall averages for all spins using all of the dopes were, also determined. Yarn properties are listed in Table 9.

TABLE 9

| Item | Spin Soln. | Capillary No. | T | E | M | To | D |
|---|---|---|---|---|---|---|---|
| | | 0.125 Mole Fraction 26 N | | | | | |
| 7-1 (S) | 53B | 2, 8 | 25.0 | 4.0 | 785 | .506 | 63.0 |
| 7-2 | 53B | 2, 3, 8 | 25.7 | 4.3 | 741 | .549 | 66.0 |
| | Overall Average | | 25.4 | 4.2 | 763 | .528 | |
| | | 0.150 Mole Fraction 26 N | | | | | |
| 7-3 | 54B | 2, 3, 5 | 22.3 | 4.0 | 688 | .493 | 63.7 |
| 7-4 (S) | 54B | 2 | 22.3 | 4.2 | 702 | .481 | 63.0 |
| 7-5 | 55B | 2 | 23.0 | 4.2 | 737 | .492 | 67.0 |
| 7-6 (S) | 55B | 2, 3, 5, 8 | 22.4 | 4.2 | 723 | .485 | 64.1 |
| | Overall Average | | 22.5 | 4.2 | 713 | .488 | |
| | | 0.20 Mole Fraction 26 N | | | | | |
| 7-7 (S) | 56B | 3, 5, 8 | 21.4 | 4.2 | 813 | .470 | 66.0 |
| | Overall Average | | 21.4 | 4.2 | 813 | .470 | |

I claim:

1. A yarn of aromatic polyamide consisting essentially of copoly(p-phenylene terephthalamide/2,6-naphthalamide) wherein the mole fraction of 2,6-naphthalamide is from 0.005 to 0.10.

2. The yarn of claim 1 wherein the yarn comprises individual filaments of 0.5 to 6 denier/filament and the yarn has a denier of 20 to 2000 grams.

3. A yarn of aromatic polyamide consisting essentially of copoly(p-phenylene terephthalamide/2,6-naphthalamide) wherein the mole fraction of 2,6-naphthalamide is from 0.005 to 0.10 and the toughness of the yarn is greater than 0.417 gpd.

4. The yarn of claim 3 wherein the tenacity of the yarn is greater than 25.7 gpd.

5. The yarn of claim 4 wherein the toughness is greater than 0.451 and the tenacity is greater than 26.7 gpd.

6. A yarn of aromatic polyamide consisting essentially of copoly(p-phenylene terephthalamide/2,6-naphthalamide) wherein the mole fraction of 2,6-naphthalamide is from 0.01 to 0.10, and the toughness and tenacity of the yarn are greater than the toughness and tenacity of a yarn of the same dimensions and made by the same processes but using a homopolymer poly(p-phenylene terephthalamide).

7. The yarn of claim 5 wherein the yarn comprises individual filaments of 0.5 to 6 denier/filament and the yarn has a denier of 20 to 2000 grams.

* * * * *